United States Patent [19]

Banks

[11] Patent Number: 5,734,897
[45] Date of Patent: Mar. 31, 1998

[54] REDUCTION OF LOGGING IN DISTRIBUTED SYSTEMS

[75] Inventor: Andrew David Banks, North Baddesley, United Kingdom

[73] Assignee: International Business Machines Corp., Armonk, N.Y.

[21] Appl. No.: 655,266

[22] Filed: Jun. 4, 1996

[30] Foreign Application Priority Data

Jun. 7, 1995 [EP] European Pat. Off. ............... 9511483

[51] Int. Cl.$^6$ ..................................................... G06F 17/30
[52] U.S. Cl. ................................. 395/618; 395/182.13
[58] Field of Search .................................. 395/618, 608, 395/617, 180, 182.13, 182.14, 182.18

[56] References Cited

U.S. PATENT DOCUMENTS

| | | | |
|---|---|---|---|
| 5,261,089 | 11/1993 | Coleman et al. | 395/608 |
| 5,319,773 | 6/1994 | Britton et al. | 395/182.13 |
| 5,319,774 | 6/1994 | Ainsworth et al. | 395/182.18 |
| 5,327,532 | 7/1994 | Ainsworth et al. | 395/200.01 |
| 5,371,886 | 12/1994 | Britton et al. | 395/618 |
| 5,410,684 | 4/1995 | Ainsworth et al. | 395/182.16 |
| 5,499,364 | 3/1996 | Klein et al. | 395/200.03 |
| 5,504,900 | 4/1996 | Raz | 395/610 |
| 5,546,582 | 8/1996 | Brockmeyer et al. | 395/680 |
| 5,581,691 | 12/1996 | Hsu et al. | 395/182.13 |
| 5,613,060 | 3/1997 | Britton et al. | 395/182.13 |

*Primary Examiner*—Paul V. Kulik
*Attorney, Agent, or Firm*—Jeanine S. Ray-Yarletts

[57] ABSTRACT

A method, for use in a two phase commit protocol, of reducing the number of agents writing to a log and the number of points in a transaction at which the log must guarantee the durability of the data is disclosed. If all of the agents involved in a transaction have access to the same log and if in a network it is relatively expensive to send a message, but little penalty for sending a long message compared to a short one, then improved performance can be obtained by sending both the data to be written to the log and the request commit flows in the same communications buffer.

10 Claims, 4 Drawing Sheets

AGENT A

215 Take Sync Point
220 Prepare Local Resources
225 Request Commit, Redo Data

AGENT B

230 Commit Request ------------------------------->

235 Prepare Local Resources
240 Log

245 Commited <-------------------------------

250 Unlock Local Resources

255 Unlock Local Resources

REDUCTION OF LOGGING IN DISTRIBUTED SYSTEMS

FIELD OF THE INVENTION

The present invention relates to the field of data processing, more specifically to distributed transaction processing systems, and in particular to reducing the total number of log records written by the distributed data processing systems.

BACKGROUND

An online data processing system requires mechanisms that, together with suitable operating procedures, provide automatic recovery from failures and allow the system to restart with as little disruption as possible. The two main recovery requirements of an online system are to maintain the integrity of data and to minimize the effect of failures.

To maintain the integrity of the data means that the data is in the form expected and has not been corrupted. The whole object of recovery operations on files, databases, and similar data resources is to maintain, and restore, the integrity of the information. Ideally, it should be possible to restore the data to a consistent, known, state following any type of failure, with a minimum loss of previous valid updating activity.

One way of doing this is to keep a record, or log, of all the changes made to a resource while the system is executing normally. If a failure occurs, the logged information can help recover the data.

The logged information can be used to back out incomplete or invalid changes to one or more resources. This is called backward recovery, or "backout" For backout, it is necessary to record the contents of a data element before it is changed. These records are called "before images". In general, backout is applicable to processing failures that prevent one or more transactions (or a batch program) from completing.

The logged information can be used to reconstruct changes to a resource, starting with a backup copy of the resource taken earlier. This is called forward recovery. For forward recovery, it is necessary to record the contents of a data element after it is changed. These records are called "after images". In general, forward recovery is applicable to data set failures, or failures in similar data resources, that cause data to become unusable because it has been corrupted or because the physical storage medium has been damaged.

In a transaction processing system, more than one transaction may read or cause changes to a single data file. It is important that transactions read valid data and that their updates are correctly recorded in order to preserve data integrity. To preserve data integrity, each transaction must have four key characteristics, Atomicity, Consistency, Isolation and Durability, known collectively by their initial letters as ACID.

Atomicity means that a transaction must be accomplished as a whole or not at all. If a transaction cannot be completed in its entirety, all its effects must be undone. This requires a backout or backward recovery facility in the transaction processing system.

Consistency means ensuring that the results of a transaction are reproducible and predictable. The transaction must always give the same results in the same conditions. This is achieved by program and code design, using such techniques as reusability and reentrancy to ensure that the same code is executed at each invocation of a transaction. An example of where particular care must be taken to ensure consistency is where two records are to be updated. Updating of a first record, followed by updating of a second record should have the same effect as updating of the second record, followed by updating of the first record, that is the order of the updates should not affect the end results achieved by the updates.

Isolation means that no transaction must interfere with any concurrently executing transaction. This is achieved by concurrency control. Several concurrently running transactions can update different records in the same data set. An efficient means of sharing the dataset needs to be provided in order to allow this concurrent updating to occur. The same record must not be updated by two transactions at the same time, that is a transaction must complete an update on a record before any other transaction is allowed to start an update on that record. The use of locking as a method of sharing achieves concurrency control. A lock is a mechanism by which use of a resource is restricted to the holder of the lock. A transaction requests the lock for a data set or for a record of that data set from the manager of that data set. The mechanism by which the lock is implemented may be a flag associated with data set or a flag associated with each record in the data set. Once a transaction receives that lock then no other transaction may update the data set or the record for which the lock was received.

Durability means that the results of a transaction must be permanent. Durability is achieved by the forward recovery process mentioned above. When a transaction has been committed (that is, it is to be made permanent or irreversible), then an image of the records changed by the transaction (an after image) is taken. If a data set failure occurs at a time after the transaction has been committed, such that a backup copy of the data set, taken at a time prior to the transaction being comitted, has to be used to replace the lost data set, then the after image of the records which were updated can be used to reinstate the updates made by the transaction.

Committing a change means making it permanent or irreversible. A single transaction can update more than one data set managed by one or more resource managers. These updates are usually logically related and data integrity is lost if one update succeeds whilst another fails. If data integrity is to be maintained, then the resource managers must be capable of either performing (committing) all the updates together when the transaction signals successful completion or of backing out all of the updates if the transaction fails. This requires commitment control, which includes a means of backing out all of the updates made by a transaction, such as a backward recovery facility, described above. Commitment procedures may be single phase commit or two phase commit (2PC). If only a single resource manager is involved in the commit process, only a single operation is necessary to commit all of the changes associated with a transaction.

If two or more resource managers are involved in a single transaction, then a commit process having two phases is used (two phase commit or 2PC). In the first phase, each resource manager is asked to prepare to commit; in the second phase, if all the resource managers have signalled that they are prepared to commit, then each resource manager is asked to commit, otherwise each resource manager is asked to backout. A participant in a two phase commit protocol is referred to as an "agent".

Existing implementations of the two phase commit protocol for distributed data processing systems, such as that in the CICS family of products from IBM Corporation, require that the participating resource managers force the writing of their log records to non-volatile storage, rather than allow the records to remain in a volatile buffer (IBM is a registered trademark and CICS is a trademark of IBM Corporation). This is required because the updates which the records are logging have to be durable in order to maintain data integrity. Durability cannot be achieved if the log records are kept in volatile storage because in the event of a failure the log records may be lost. Existing implementations require this because the log records so written are read during a recovery process after a failure in order to restore the data to a consistent state. This is generally a performance bottleneck in an implementation of two phase commit because the forced writing of log records to non-volatile storage must be completed before continuing with the commit process. Such forced writing requires interactions with nonvolatile storage such as disk drives, and such interactions are slow. As a result of this, two phase commit processing imposes a significant performance overhead on all transaction processing.

CICS/ESA V4.1 Intercommunications Guide—SC33-1181-00, published by IBM Corporation, on pages 259-260 discloses a prior art technique known as "last agent" optimisation in which the last agent in a chain does not have a prepare phase. The last agent commits when it receives a request to prepare to commit. This technique is described in more detail later.

SUMMARY OF THE INVENTION

Accordingly the invention provides a method, for use in a two phase commit protocol between a plurality of agents, each agent having an associated recovery log, of reducing the number of forced writes to recovery logs, the method comprising the steps of: a first agent sending a commit request to a next agent in a chain of agents; each subsequent agent in said chain sending said commit request received from a previous agent in the chain to a next agent in the chain, until a last agent in the chain has been reached; writing by said last agent to its associated recovery log of a commit record indicating that the changes are to be committed; said last agent sending a committed message to a previous agent in a chain of agents; and repeating said step of sending a committed message until the first agent in the chain has been reached; characterised in that: data representing commit records to be logged for said first and said subsequent agents is added by each of said first and said subsequent agents to said commit request prior to sending said commit request received from a previous agent in the chain to a next agent in the chain; and said logging of said commit records is completed by the last agent only.

Using the method of the present invention, the first and subsequent agents in the chain add data representing their commit records to the commit request which is then passed on the next agent in the chain. In the prior art, this data has to be saved to non-volatile storage before the commit request can be passed on to the next agent in the chain. Saving data to non-volatile storage is slow compared to the speed of processing in modern data processing systems. In a typical system processing numerous transactions, the saving of time in not having to wait for non-volatile storage to be written to results in a significant improvement in performance. It is an advantage to have a method in which forced writing of data is required to only a single log. A further advantage of a single log is that management of the system is simpler.

The chain of agents may be continuous or may split into a plurality of chains at an intermediate agent, the plurality of chains recombining at the last agent. If the chain splits, then the sending of a committed message to a previous agent in the chain of agents preferably only occur via one of the plurality of chains.

The invention also provides a data processing apparatus, for use in a two phase commit protocol, wherein the number of separate messages sent between agents is reduced, and wherein the number of forced writes to recovery logs associated with said agents is reduced, the apparatus comprising: two or more agents arranged in a chain, each agent having an associated recovery log; means in a first agent in the chain for sending a commit request to a next agent in the chain of agents; means in each agent in the chain for forwarding said commit request until a last agent in the chain has been reached; means in said last agent for logging a commit record indicating that the changes are to be committed; means in said last agent for sending a committed message to a previous agent in a chain of agents; and means in each agent in the chain for forwarding said committed request until said first agent in the chain has been reached; characterised in that: data representing said commit records to be logged is sent with said commit requests; and commit records are logged only onto a log associated with the last agent in the chain of agents.

DESCRIPTION OF THE PREFERRED EMBODIMENT

Figure 1:
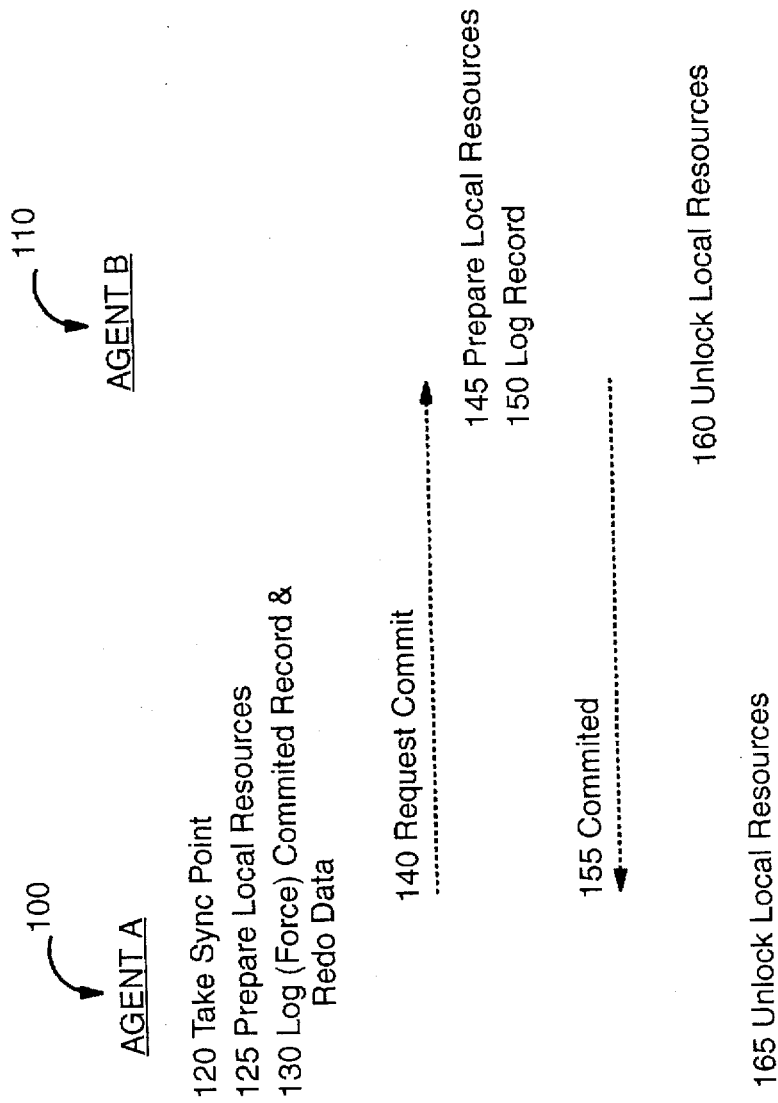
FIG. 1 depicts a prior art two party commit process.

In prior art wide area networks, interconnected machines ensure the consistency of data updated at multiple sites by using a two phase commit protocol such as that described as prior art above. These protocols require all the agents located at the multiple sites to abide by (prepare for) the outcome of a transaction and then to each enact the outcome. This involves the writing of log records during the commit processing and the flowing of messages during the commit processing.

In order to exploit parallel processing of transactions, clusters of processors may be used. Each processor may have a single agent located on it, or it may have multiple agents located on it. These may be a parallel processing computer or a set of workstations connected to a local area network. The computer or the networked workstations or any similar combination must be part of a network in which there exists an "Any to Any" connection. Such a connection has to allow the transfer of data, which may represent requests associated with a two phase commit protocol or data to be transferred between the agents. The connection is implemented using a communications buffer, in which the agent sending the information places the information into a communications buffer. Hardware or software associated with each agent removes the information from the communications buffer and sends it to corresponding hardware or software associated with the agent to which the information is to be sent. The corresponding hardware and/or software in the receiving agent places the information in a communications buffer associated with the receiving agent. With such connections in a network it is relatively expensive to send a message, but there is little penalty for sending a long message compared to a short one.

A certain level of reliability is required for the system as a whole, because only a single log in the system contains the data required for recovery of a given transaction. With systems presently available, a wide area network would not generally meet such a reliability criteria. Should such systems having the necessary level of reliability become available, then they may be used with the present invention.

In a prior art wide area network each agent has its own log and writes log records for recovery, if necessary, to its log during the commit process. More significantly only that agent reads its log during recovery after a failure in order to recover the state of and complete or backout a transaction. This achieves a great deal of independence between the agents taking part in the transaction.

In the present invention, the number of forced writes to recovery logs by agents, arranged in a chain, each of which have an associated recovery log, is reduced by the first agent in the chain adding data representing commit records to be logged for the first agent to the commit request prior to sending the commit request to a next agent in the chain. The commit request is then sent to the next agent in the chain. Each subsequent agent in the chain adds data representing commit records to be logged for the subsequent agent to the commit request prior to sending the commit request, with the added data, to a next agent in the chain. This continues with each subsequent until a last agent in the chain is reached. When the commit request and added data reaches the last agent in the chain of agents, it writes to its associated recovery log, a commit record indicating that the changes are to be committed. The commit record is only logged by the last agent. The last agent then sends a committed message to a previous agent in the chain of agents. The previous agent, on receiving the committed message sends it to a previous agent in the chain of agents. This step is repeated until the first agent in the chain is reached.

In the protocol of the present invention, each agent in the chain of agents having resources affected by the transaction requires access to the log which contains log records relevant to a specific transaction. That log is associated with the last agent in the chain of agents and is a single log for all the transactions for which log data is written by that agent. In another embodiment, that log may be implemented as more than one log associated with the last agent for improved availability and throughput. There may be a separate log for each transaction, or there may be separate logs for the records associated with each resource managed by the last agent.

Both the data supplied by each agent in the chain of agents to be written to the log associated with the last agent and the commit request sent by each agent in the chain to the next agent in the chain are sent in a single communications buffer from one agent in the chain to the next agent in the chain. As mentioned above, it is relatively expensive to send a message, but there is little penalty for sending a long message compared to a short one.

Thus the number of agents interacting with the single log associated with the last agent and the number of points at which the log must guarantee the durability of the data are reduced. As a consequence of this, fewer flows are required, both between the agents and their associated logs and between the agents themselves. Each flow between the agents and their associated logs requires a saving of data to nonvolatile storage, such as a direct access storage device (DASD). Such saving of data is very slow compared to the speed of the processor processing the transaction. Each flow between the agents themselves requires data to be inserted into a communications buffer, suitable header information added and processing completed to allow the data to be transmitted by the sending agent to the receiving agent. This adds considerable overhead, which is largely the same, whether a single byte of data is sent or whether the communications buffer is filled. With numerous transactions being processed by each agent, the considerable savings in time by the reduction in the number of flows between agents and their associated logs and between the agents themselves for each transaction are multiplied by the number of transactions being processed.

In a simplest implementation of a two phase commit protocol, the decision to commit or to backout updates is taken when a transaction completes successfully or when it fails. In a preferred embodiment, updates are arranged so that there is consistency of data at other logical points during the execution of the transaction. All such points of data consistency (including transaction termination) are called commit points or sync points.

A sync point is taken at the end of every transaction. Whenever a sync point is taken, the system goes through a two phase commit protocol to ensure consistency of data. An application can explicitly request a sync point to be taken at any point in a transaction. An interrupted transaction can be restarted from its last sync point.

In the following explanation of a preferred embodiment, the following rules apply to the log used:

1. All of the agents involved in this type of processing have access to the same log and can read it, should they need to do so for recovery processing. They have access to the log, because their data is stored on the log associated with the last agent in the chain of agents, to which they have access. This will be the case for Local Area Network based systems, or parallel processing systems, since in such systems all agents have a connection to all other agents in the network, and hence have access to the log.

2. Either none of the data for a particular transaction (for any agent) or all of the data for a transaction (for all of the agents) must be written to the log. This assumption is required for any log in a transaction processing system, since if only part of the data associated with a transaction is present on the log, then in the event of recovery being required, it will not be possible to determine whether part of the data is present and part missing because of a failure or because not all of the log data fro a transaction was intended to be written.

3. If the log is being read by a particular agent, for the purposes of recovery, then no further writes to it may take place on behalf of that or any other agent. This eliminates the possibility that a second agent involved in the transaction may write to the log after a first agent has started reading it for recovery processing.

Consider the prior art example of a presume nothing two phase commit between two agents A and B using last agent optimization, which results in a commit. The sequence of events without flowing log data is shown in FIG. 1.

Agent A 100 requests that a synch point be taken 120. This synch point may be requested at the end of a transaction or at some intermediate point at which it is desired that the data be in a consistent state.

At 125 the local resources are prepared. The local resources are already locked. Any resources local to Agent A 100 involved in the transaction will have been locked by Agent A against updates being made to them by another transaction. In a given transaction there may be local resources involved in the transaction or there may be none involved in the transaction.

At 130 a log record containing information that the transaction is to be committed and containing any "after images" necessary to allow the transaction to be redone in the event of recovery from a failure being required is forced to be written to the log stored on non-volatile storage.

At 140 a Request Commit is placed in a communications buffer for transmission to Agent B 110, requesting that Agent B 110 commit the transaction.

At 145 Agent B 110 prepares the local resources which are already locked. Any resources local to Agent B involved in the transaction will have been locked by Agent B against updates being made to them by another transaction.

A log record containing information that the transaction is to be committed and containing any "after images" necessary to allow the transaction to be redone in the event of recovery from a failure being required is forced to be written to the log stored on non-volatile storage at step 150.

At step 155 a message is placed in a communications buffer of Agent B 110 for transmission to Agent A 100 informing Agent A 100 that the commit record and associated "after image" data has been written to the log and that the transaction has been committed.

Agent B 110 then unlocks the local resources 160. Any local resources involved in the transaction are now unlocked since updates may now be made by other transactions to the resources without affecting the integrity of the data.

At 165, Agent A 100 unlocks it's local resources so that updates may be made by other transactions to the resources without affecting the integrity of the data. The next normal flow to Agent B 110 implies that log data can be purged.

In this prior art, a single pair of messages is exchanged between Agent A and Agent B, a message from A to B at 140 and a message from B to A at 155. Two forced writes to the log are done, the first at 130 by Agent A 100, the second at 150 by Agent B 110.

Figure 2:
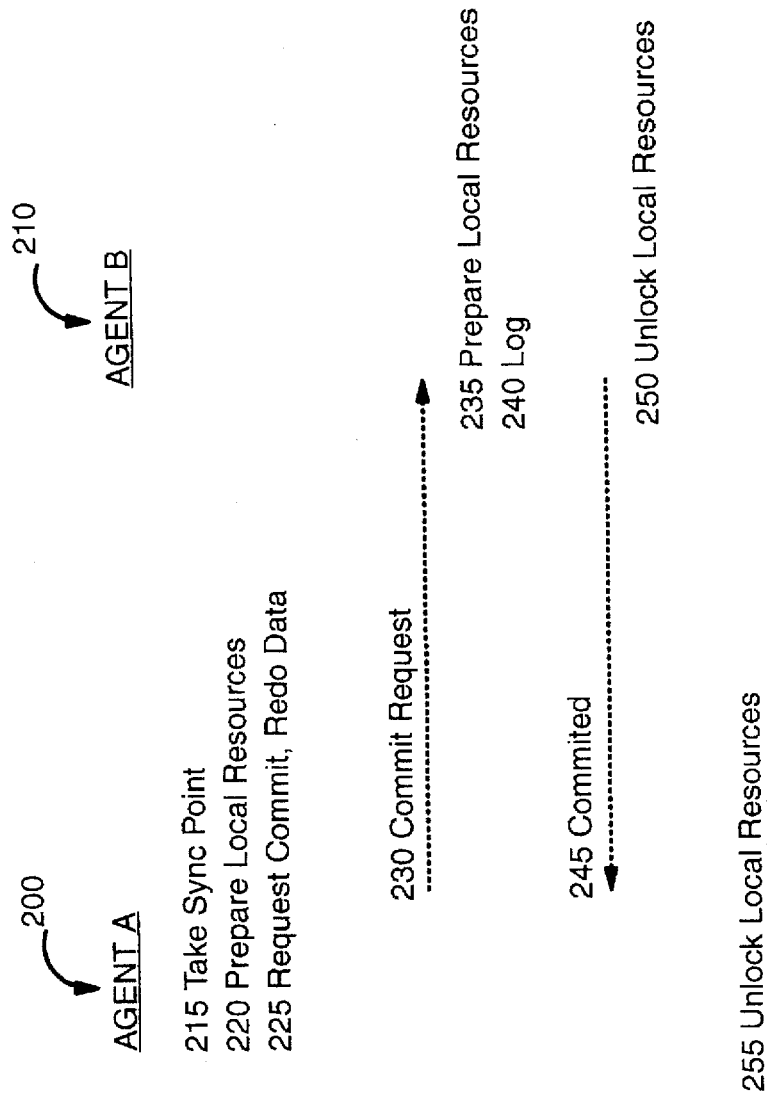
FIG. 2 depicts an embodiment of the two party commit process of the present invention.

In an embodiment of the present invention, if A and B have access to the same log then the data flows between A and B can become as is shown in FIG. 2.

At 215, Agent A 200 begins to take a sync point. This may be at the end of a transaction or at some intermediate point at which it is desired that the data be in a consistent state. Agent A 200 first prepares the local resources 220. Any local resources involved into the transaction will have already been locked by Agent A against updates being made to them by another transaction. In a given transaction there may be local resources involved in the transaction or there may be none involved in the transaction.

At 225 a Request-Commit-redo data-commit record is prepared. A log record containing information that the transaction is to be committed and containing any "after images" necessary to allow the transaction to be redone in the event of recovery from a failure being required is constructed by Agent A 200 for writing onto the log associated with the last agent in the chain of agents. At 230 this record is placed in a communications buffer for transmission to Agent B 210 together with a request that Agent B 210 commit the transaction.

Agent B 210 then prepares the local resources 235 which are already locked against updates by other transactions. A Log (Force) Committed record and redo data and committed record is logged at 240. This means that a log record containing information that the transaction is to be committed and containing any "after images" necessary to allow the transaction to be redone in the event of recovery from a failure being required is forced to be written to the log associated with Agent B 210 which is stored on non-volatile storage. A corresponding log record and "after images" from Agent A 200 which was sent at 230 is also forced to be written to the log associated with Agent B 210 on behalf of Agent A 200.

A Committed message 245 is then placed in a communications buffer for transmission to Agent A 200, informing Agent A that the Commit record and associated "after image" data has been written to the log and that the transaction has been committed.

At 250, Agent B 210 unlocks its local resources. Any local resources involved in the transaction are now unlocked by Agent B 210 since updates may now be made by other transactions to the resources without affecting the integrity of the data.

At 255, Agent A 200 unlocks its local resources since updates may now be made by other transactions to the resources without affecting the integrity of the data. The next formal flow between Agent A 200 and Agent B 210 implies that log records can be purged.

In this embodiment, a single pair of messages is exchanged between Agent A and Agent B, a message from A to B at 230 and a message from B to A at 245. Only one forced write to the log is done, at 240 by Agent B of data for Agent B and of data for Agent A.

Figure 3:
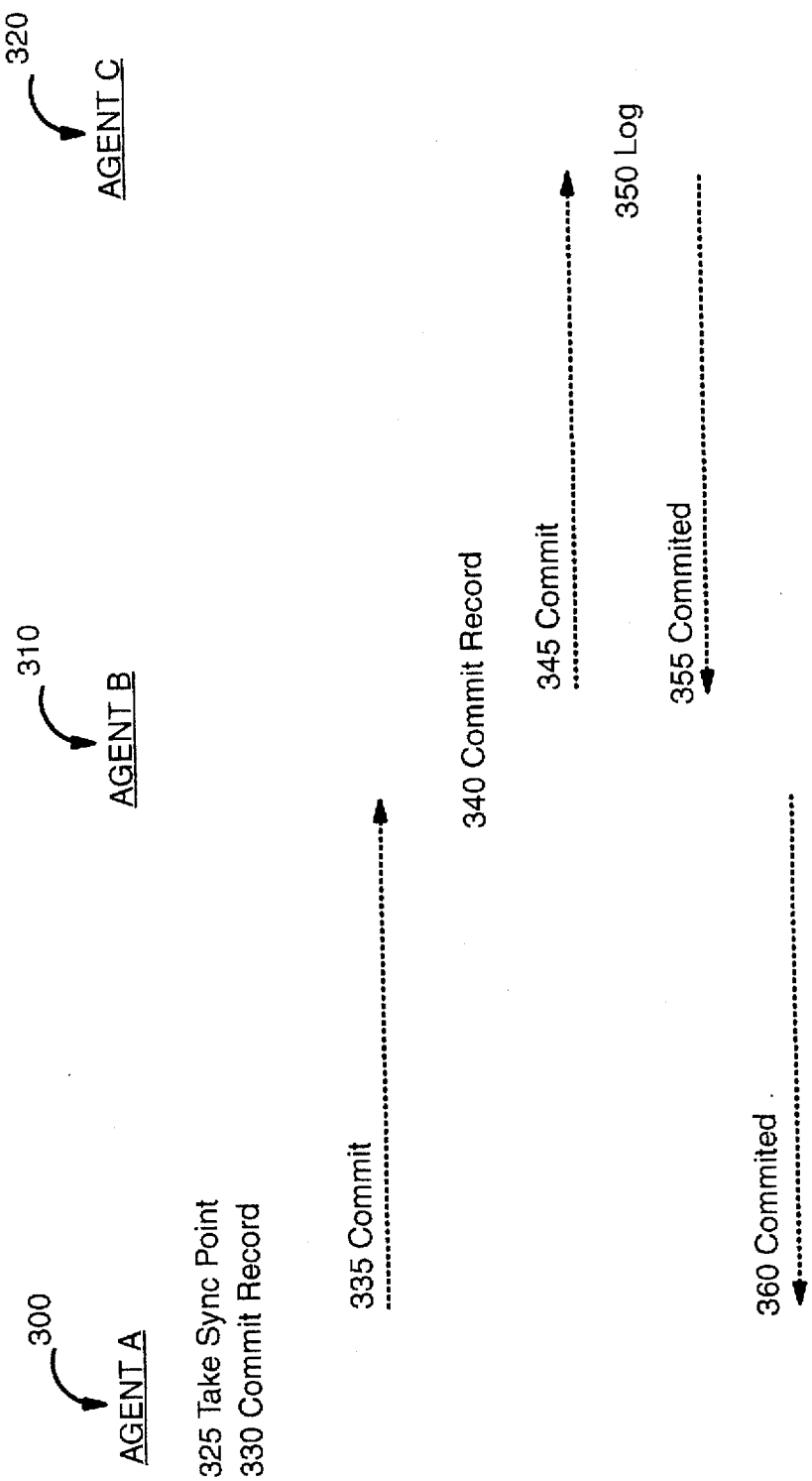
FIG. 3 depicts an embodiment of the present invention using three agents.

In another embodiment of the invention, a single pair of messages and a single log force can be used to commit data for any number of agents in a chain as is shown in FIG. 3 using three Agents.

Agent A 300 begins a sync point 325. A commit record and any after images are constructed 330 by Agent A 300. This information is placed into a communications buffer 335 for transmission to Agent B 310.

Agent B 310 then constructs a commit record 340 and any after images. This is added to the information received from Agent A 300 and is placed in a communications buffer 345 for transmission to Agent C 320.

Agent C 320 then logs the commit and redo data 350 for A, B and C. A commit record and any after images for Agent C 320 are written to the log associated with Agent C. The commit records and after images received from Agent B and containing information from Agent A and Agent B are written on the log associated with Agent C on behalf of Agents A and B.

Next, a committed message 355 is placed in a communications buffer from Agent C 320 for transmission to Agent B 310 that the Commit records and associated 'after image' data for Agents A, B and C have been written to the log and that the transaction has been committed.

A committed message 360 is then passed from Agent B 310 to Agent A 300. Agent B passes the message it received from Agent C by placing the message in a communications buffer. The next normal flow between Agent A and Agent C implies that log records can be purged.

Figure 4:
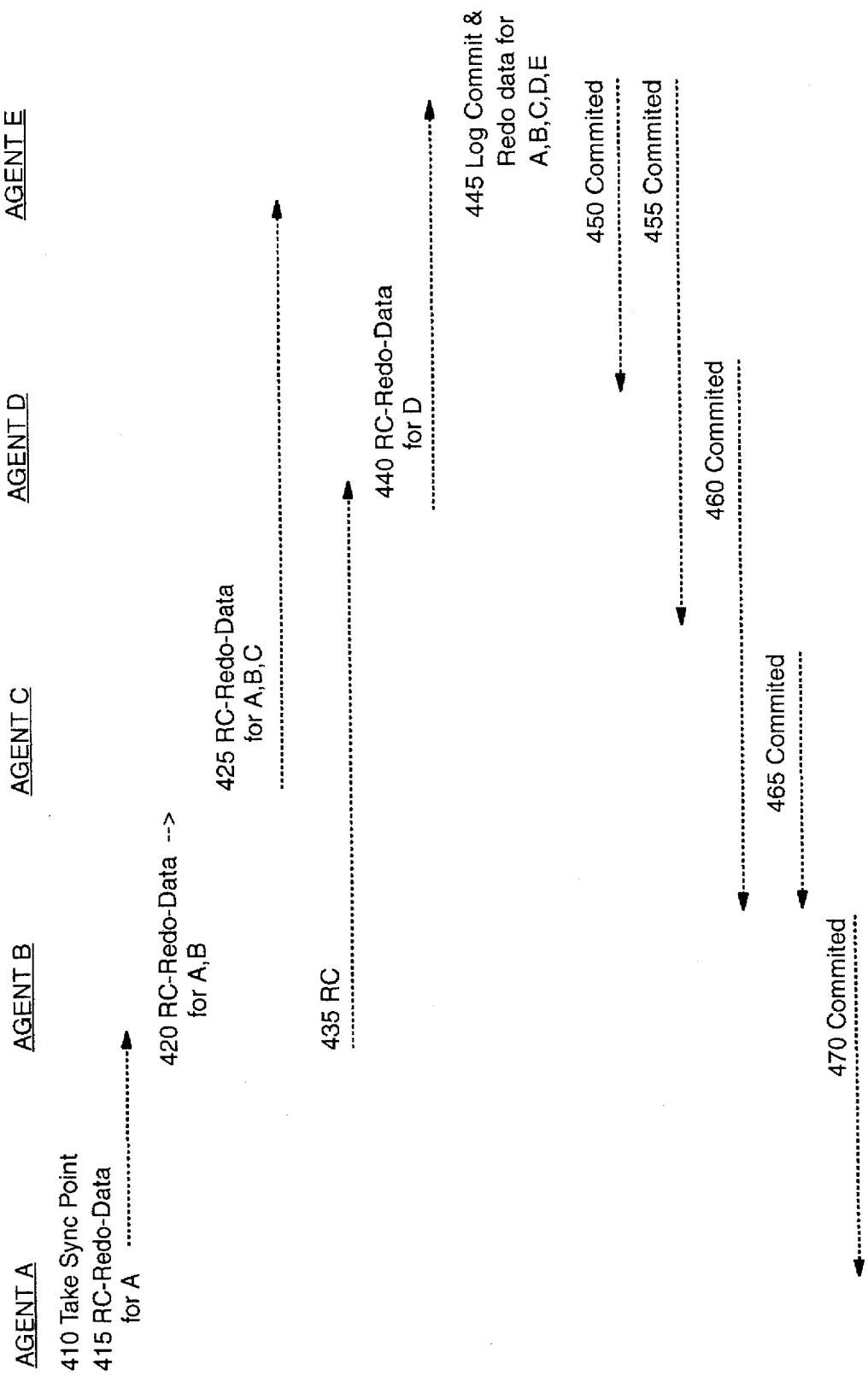
FIG. 4 depicts an embodiment of the present invention using five agents.

In this second embodiment three agents are committed using two pairs of messages and a single log force. Two pairs of messages are exchanged, one pair between Agent A and Agent B and one pair between Agent B and Agent C. Only one forced write to the log is done by Agent C for itself and for the data from Agent A and Agent B.

Where the commit tree is not a chain, only a single pair of messages need be sent between agents so long as the same log is used for all of the agents. An example of this is shown in FIG 4.

At 410, Agent A 400 begins a sync point. Agent A prepares a commit record 415 and passes it to Agent B 401. Agent B then prepares a commit record 420 for Agents A and B and sends it to Agent C 402. Agent C prepares a commit record for Agents A, B & C and sends it to Agent E 404. Agent B then prepares a commit record 435 and sends it to Agent D 403. Agent D prepares a commit record for Agent D 440 and sends it to Agent E 404. At this point Agent E 404 logs the commit and redo data for Agents A, B, C, D and E. Agent E then prepares committed responses for Agent D 450 and for Agent C 455. Agent D passes a committed response 460 to Agent B. Agent C also passes a committed response 465 to Agent B. Then Agent B passes a committed response 470 to Agent A. The next normal flow between A and E implies that log records can be purged.

The commit tree splits at B and recombines at E. As in the prior art type of two phase commit protocol the flows need to contain the information that E will do the eventual logging and that no logging may occur until both parts of the flow have arrived at E. The Committed flow between C and B contains redundant information and could be omitted.

The recombination does not have to occur at the last agent, that is the agent which is to actually log the requests and after image data on its log. In the example above, there could be a further agent, Agent F, which receives the commit requests and after images for Agents A to E, and logs this together with its own data on its associated log. In this case, Agent E does not forward the commit request and the associated data, together with its own log data until it receives the commit requests and associated data from both parts of the chain. As in the prior art, both parts of the flow contain information that the flow has split, and that when each part arrives at Agent E, then Agent E should not forward the request, adding its own data until both parts of the flow are received.

When there are two agents involved in the two phase commit protocol, the invention provides a saving in the number of agents interacting with the single log associated with the last agent and the number of points at which the log must guarantee the durability of the data. The consequent fewer data flows and fewer occasions when data must be saved to non-volatile storage provides improved throughput. When there are more than two agents involved in the two phase commit protocol, the saving provided by the invention is increased. In a typical transaction processing system, there are more than two agents involved.

I claim:

1. A method, for use in a two phase commit protocol between a plurality of agents, each agent having an associated recovery log, of reducing the number of forced writes to recovery logs, the method comprising the steps of:

a first agent sending a commit request to a next agent in a chain of agents;

each subsequent agent in said chain sending said commit request received from a previous agent in the chain to a next agent in the chain, until a last agent in the chain has been reached;

writing by said last agent to its associated recovery log of a commit record indicating that the changes are to be committed;

said last agent sending a committed message to a previous agent in a chain of agents; and repeating said step of sending a committed message until the first agent in the chain has been reached, wherein: data representing commit records to be logged for said first and said subsequent agents is added respectively by each of said first and said subsequent agents to said commit request prior to sending said commit request received from a previous agent in the chain to a next agent in the chain; and said logging of said commit records is completed by the last agent only.

2. A method as claimed in claim 1 wherein, prior to the step of sending a commit request, said first agent and each of said subsequent agents prepares any resources, local to the respective agents, which have already been locked.

3. A method as claimed in claim 1 wherein, after the committed message is received, said first agent and each of said subsequent agents unlocks any resources, local to the respective agents, which were locked.

4. A method as claimed in claim 1 wherein, prior to logging by said last agent of a commit record, said last agent prepares any local resources which have already been locked.

5. A method as claimed in claim 1 wherein, after logging by said last agent of a commit record, said last agent unlocks any local resources which were locked.

6. A method as claimed in claim 1 wherein, said chain of agents splits into a plurality of chains at an intermediate agent, and said plurality of chains recombines at an intermediate agent or at said last agent.

7. A method as claimed in claim 6 wherein sending of a committed message to a previous agent in the chain of agents only occurs via one of said plurality of chains.

8. Data processing apparatus, for use in a two phase commit protocol, wherein the number of forced writes to recovery logs associated with agents participating in said two phase commit protocol is reduced, the apparatus comprising:

two or more agents arranged in a chain, each agent having an associated recovery log;

means in a first agent in the chain for sending a commit request to a next agent in the chain of agents;

means in each agent in the chain for sending said commit request received from a previous agent in the chain to a next agent in the chain, until a last agent in the chain has been reached;

means in said last agent for writing to its associated recovery log, a commit record indicating that the changes are to be committed;

means in said last agent for sending a committed message to a previous agent in a chain of agents; and means in each agent in the chain for sending said committed request to a previous agent in the chain until said first agent in the chain has been reached, wherein:

data representing said commit records to be logged for said first and said subsequent agents is added respectively by each of said first and said subsequent agents to said commit request prior to sending said commit request received from a previous agent in the chain of agents to a next agent in the chain of agents; and commit records are logged only onto a log associated with the last agent in the chain of agents.

9. A data processing apparatus as claimed in claim 8 wherein, said chain of agents splits into a plurality of chains at an intermediate agent, and said plurality of chains recombines at an intermediate or at said last agent.

10. A data processing apparatus as claimed in claim 9 wherein sending of a committed message to a previous agent in the chain of agents only occurs via one of said plurality of chains.

* * * * *